(12) United States Patent
Shen et al.

(10) Patent No.: US 12,052,579 B2
(45) Date of Patent: Jul. 30, 2024

(54) INFORMATION TRANSMISSION METHOD, TERMINAL AND NETWORK DEVICE

(71) Applicant: VIVO MOBILE COMMUNICATION CO., LTD., Chang'an Dongguan (CN)

(72) Inventors: Xiaodong Shen, Chang'an Dongguan (CN); Xueming Pan, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 490 days.

(21) Appl. No.: 17/360,397

(22) Filed: Jun. 28, 2021

(65) Prior Publication Data

US 2021/0329470 A1 Oct. 21, 2021

Related U.S. Application Data

(63) Continuation of application No. PCT/CN2019/106942, filed on Sep. 20, 2019.

(30) Foreign Application Priority Data

Dec. 28, 2018 (CN) .......................... 201811626877.6

(51) Int. Cl.
*H04W 16/14* (2009.01)
*H04L 1/00* (2006.01)
(Continued)

(52) U.S. Cl.
CPC .......... *H04W 16/14* (2013.01); *H04L 1/0038* (2013.01); *H04W 72/0446* (2013.01); *H04W 72/23* (2023.01)

(58) Field of Classification Search
None
See application file for complete search history.

(56) References Cited

U.S. PATENT DOCUMENTS 11,398,878 B2 * 7/2022 Seo .................. H04W 72/23
11,438,117 B2 * 9/2022 Seo .................. H04W 72/23
(Continued)

FOREIGN PATENT DOCUMENTS

| CN | 101299871 A | 11/2008 |
|---|---|---|
| CN | 102170703 A | 8/2011 |

(Continued)

OTHER PUBLICATIONS

International Search Report & Written Opinion related to Application No. PCT/CN2019/106942; reported on Jul. 8, 2021.
(Continued)

*Primary Examiner* — Eunsook Choi
(74) *Attorney, Agent, or Firm* — von Briesen & Roper, s.c.

(57) ABSTRACT

An information transmission method, a terminal and a network device are provided. The method includes: receiving configuration information of a downlink transmission identification signal, where the configuration information includes: a detection period and/or a detection position; and a detection period and a detection period indicated by the configuration information; and detecting the downlink transmission identification signal on a first time-domain transmission unit according to the detection period and/or a detection position indicated by the configuration information.

20 Claims, 5 Drawing Sheets

(51) Int. Cl.
H04W 72/0446 (2023.01)
H04W 72/23 (2023.01)

(56) References Cited

U.S. PATENT DOCUMENTS

| 2010/0184444 | A1 | 7/2010 | Suo et al. | |
|---|---|---|---|---|
| 2019/0082453 | A1 | 3/2019 | Lyu et al. | |
| 2020/0045696 | A1* | 2/2020 | Huang | H04L 5/10 |
| 2021/0067268 | A1* | 3/2021 | Seo | H04L 25/0238 |

FOREIGN PATENT DOCUMENTS

| CN | 107370562 A | 11/2017 |
|---|---|---|
| CN | 107666713 A | 2/2018 |
| CN | 108737040 A | 11/2018 |
| EP | 3244644 A1 | 11/2017 |
| WO | 2017193980 A1 | 11/2017 |
| WO | 2018058453 A1 | 4/2018 |
| WO | 2018133779 A1 | 7/2018 |

OTHER PUBLICATIONS

First Chinese Office Action for related Application No. 201811626877.6; reported on Jan. 25, 2021.
Second Chinese Office Action for related Application No. 201811626877.6; reported on Aug. 3, 2021.
Vivo, "Discussion on physical DL channel design in unlicensed spectrum", Oct. 8-12, 2018, 3GPP TSG RAN WG1 Meeting #94bis, Chengdu, China.
OPPO, "UE Adaptation to the Traffic and UE Power Consumption", Nov. 12-16, 2018, 3GPP TSG RAN WG1 Meeting #95, Spokane, USA.
R1-1810445—MediaTek Inc. "Discussion on NR-U configured grant" Agenda item: 7.2.2.4.4, Document for: Discussion, 3GPP TSG RAN WG1 Meeting #94bis, Chengdu, China, Oct. 8-12, 2018.
First Korean Office Action related to Application No. 10-2021-7023289; reported on Aug. 17, 2022.
R1-1812298—Source: Vivo "Discussion on physical DL channel design in unlicensed spectrum" Agenda item: 7.2.2.3.1, Document for: Discussion and Decision, 3GPP TSG RAN WG1 Meeting #95, Spokane, US, Nov. 12-16, 2018.
Extended European Search Report for related Application No. 19905365.3; reported on Mar. 2, 2022.
R1-1813411—Qualcomm Incorporated "DL signals and channels for NR-U" Agenda item: 7.2.2.3.1, Document for: Discussion and Decision, 3GPP TSG RAN WG1 Meeting #95, Spokane, USA, Nov. 12-Nov. 16, 2018.
Third Korean Office Action related to Application No. 10-2021-7023289; reported on Jun. 20, 2023.

\* cited by examiner

INFORMATION TRANSMISSION METHOD, TERMINAL AND NETWORK DEVICE

CROSS-REFERENCE TO RELATED APPLICATION

This application is continuation application of PCT International Application No. PCT/CN2019/106942 filed on Sep. 20, 2019, which claims priority to Chinese Patent Application No. 201811626877.6 filed in China, Dec. 28, 2018, the disclosures of which are incorporated herein by reference their its entireties.

TECHNICAL FIELD

The present disclosure relates to the field of communications technologies, and in particular to an information transmission method, a terminal and a network device.

BACKGROUND

In a mobile communications system, as an unlicensed band (unlicensed spectrum) is shared by multiple technologies or multiple transmission nodes, such a contention-based access mode leads to uncertainty in channel available time. A terminal or a network device needs to perform clear channel assess (CCA)/extended clear channel assess (eCCA) to listen to a channel before sending information, that is, to perform energy detection (ED). When energy is lower than a certain threshold, the channel is judged to be empty before transmission can be started.

However, for a terminal that needs to receive data, it needs to perform a physical downlink control channel (PDCCH) blind decoding on each sub-frame/slot (slot), regardless of whether a network device sends data or not, which causes a lot of unnecessary power consumption. For unlicensed band transmission in a 4th generation (4G) mobile communications system, or known as long term evolution-licensed assisted access (LTE-LAA), the terminal may determine whether the network device performs downlink transmission by detecting a cell reference signal (CRS) sent, that is, the terminal starts PDCCH blind decoding only after detecting that there is a CRS in a sub-frame. However, there is no CRS in a $5^{th}$ generation (5G) communications system, or known as new radio (NR). If the terminal needs to perform PDCCH blind decoding on each sub-frame/slot (slot), it will cause great power consumption by the terminal.

A low-complexity signal or channel may be used to identify a downlink transmission mode, to reduce the power consumption by the terminal, and the terminal performs PDCCH blind decoding only after confirming there is a downlink transmission. For example, as shown in FIG. 1, the network device may also send a transmission identification signal in each sub-frame/slot for sending downlink data, which will cause excessive system overhead.

SUMMARY

Embodiments of the present disclosure provide an information transmission method, a terminal, and a network device.

According to a first aspect, an embodiment of the present disclosure provides an information transmission method, applied to a terminal side and including:

receiving configuration information of a downlink transmission identification signal, where the configuration information includes: a detection period and/or a detection position; and detecting the downlink transmission identification signal on a first time-domain transmission unit according to the detection period and/or a detection position indicated by the configuration information.

According to a second aspect, an embodiment of the present disclosure further provides a terminal, including:

a first receiving module, configured to receive configuration information of a downlink transmission identification signal, where the configuration information includes: a detection period and/or a detection position; and a detecting module, configured to detect a downlink transmission identification signal on a first time-domain transmission unit according to a detection period and/or a detection position indicated by the configuration information.

According to a third aspect, an embodiment of the present disclosure provides a terminal, where the terminal includes a processor, a memory, and a computer program that is stored in the memory and that can run on the processor, and steps of the foregoing information transmission method are implemented in the case that the computer program is executed by the processor.

According to a fourth aspect, an embodiment of the present disclosure provides an information transmission method, applied to a network device side, and including:

configuring configuration information of a downlink transmission identification signal for a terminal, where the configuration information includes: a detection period and/or a detection position; and sending a downlink transmission identification signal on a time-domain transmission unit in a detection period in the case that downlink data is scheduled for a terminal.

According to a fifth aspect, an embodiment of the present disclosure provides a network device, including:

a configuring module, configured to configure configuration information of a downlink transmission identification signal for a terminal, where the configuration information includes: a detection period and/or a detection position; and a sending module, configured to send a downlink transmission identification signal according to a detection period and/or a detection position indicated by the configuration information in the case that downlink data is scheduled for a terminal.

According to a sixth aspect, an embodiment of the present disclosure further provides a network device, where the network device includes a processor, a memory, and a computer program that is stored on the memory and that can run on the processor, and steps of the foregoing information transmission method are implemented in the case that the computer program is executed by the processor.

According to a seventh aspect, an embodiment of the present disclosure provides a computer-readable storage medium, with a program stored thereon, where steps of the foregoing information transmission method are implemented in the case that the program is executed by a processor.

In this way, a terminal according to the embodiments of the present disclosure detects a downlink transmission identification signal on a first time-domain transmission unit according to an instruction of configuration information. Accordingly, a network device does not need to send a downlink transmission identification signal on every time-domain transmission unit where there is a downlink transmission, thus lowering system overhead and improving system throughput.

DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying.

DESCRIPTION OF EMBODIMENTS

Figure 1:
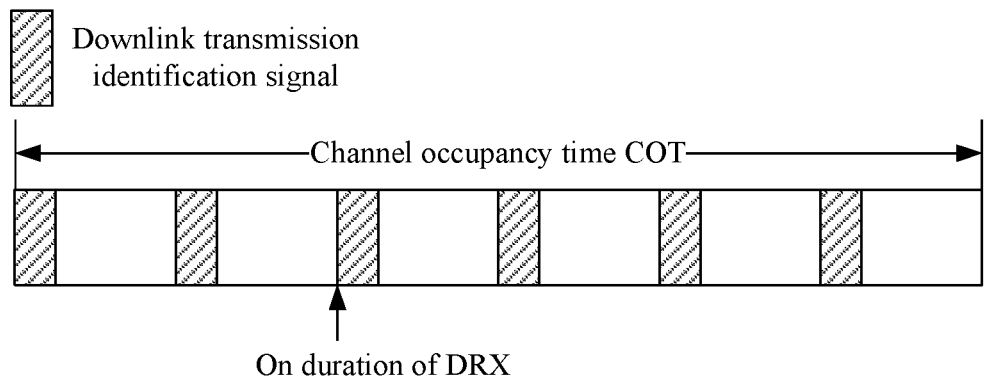
FIG. 1 illustrates a schematic diagram 1 of transmission mapping of transmission identification signals in the related art.

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, these embodiments are provided to enable a more thorough understanding of the present disclosure and to fully convey the scope of the present disclosure to those skilled in the art.

The terms "first", "second", and the like in this specification and claims of the present application are used to distinguish between similar objects instead of describing a specific sequence or order. It should be understood that the data termed in such a way is interchangeable in proper circumstances so that the embodiments of this application described herein can be implemented in an order other than the order illustrated or described herein. Moreover, the terms "include", "contain" and any variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. "And/or" used in the specification and claims means at least one of the connected objects.

The technology described in this specification is not limited to a long term evolution (LTE)/LTE-Advanced (LTE-A) system. It may also be applied in various wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and another system. The terms "system" and "network" are often used interchangeably. The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following description provides examples and does not limit the scope, applicability, or configuration set forth in the claims. The functions and arrangements of the elements under discussion may be changed without departing from the spirit and scope of the present disclosure. In various examples, various procedures or components may be omitted, replaced, or added appropriately. For example, the described method may be performed in an order different from that described, and steps may be added, omitted, or combined. In addition, features described with reference to some examples may be combined in other examples.

Figure 2:
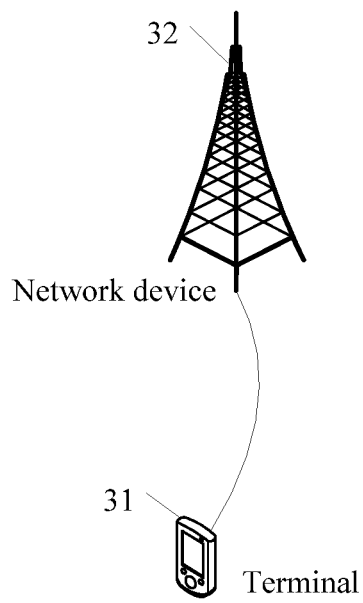
FIG. 2 illustrates a block diagram of a mobile communications system applicable to an embodiment of the present disclosure.

Referring to FIG. 2, FIG. 2 illustrates a block diagram of a wireless communications system applicable an embodiment of the present disclosure. The wireless communications system includes a terminal 21 and a network device 22. The terminal 21 may be referred to as terminal equipment or user equipment (UE) as well, and the terminal 21 may be a mobile phone, a tablet personal computer (Tablet Personal Computer), a laptop computer (Laptop Computer), a personal digital assistant (PDA), a mobile Internet device (MID), a wearable device (Wearable Device), on-board equipment or another terminal-side device. It should be noted that a specific type of the terminal 21 is not limited in the embodiments of the present disclosure. The network device 22 may be a base station or a core network, where the foregoing base station may be a base station of 5G and later releases (such as gNB, 5G NR, NB), or a base station in another communications system (such as an eNB, a WLAN access point, or another access point), and the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, or another appropriate term in the art. Provided that the same technical effect is achieved, the base station is not limited to specific technical vocabulary. It should be noted that the base station in an NR system is merely used as an example, but a specific type of the base station is not limited in the embodiments of this disclosure.

The base station can communicate with the terminal 21 under the control of a base station controller. In various examples, the base station controller may be a part of the core network or some base stations. Some base stations can exchange control information or user data with the core network through backhaul. In some examples, some of these base stations may communicate directly or indirectly with each other through a backhaul link, and the backhaul link may be a wired or wireless communication link. The wireless communications system can support operations on a plurality of carriers (waveform signals of different frequencies). A multi-carrier transmitter can simultaneously transmit a modulated signal on multiple carriers. For example, each communication link may be a multi-carrier signal modulated based on various radio technologies. Each modulated signal can be sent over different carriers and can carry control information (for example, a reference signal or a control channel), overhead information, data, and the like.

The base station can wirelessly communicate with the terminal 21 via one or more access point antennas. Each base station can provide communication coverage for its corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

A communication link in the wireless communications system may include an uplink for carrying uplink (UL) transmission (for example, from the terminal 21 to the network device 22) or a downlink for carrying downlink (DL) transmission (for example, from the network device 22 to the terminal 21). The UL transmission may also be referred to as reverse link transmission, and the DL transmission may also be referred to as forward link transmission. The downlink transmission may be performed over a licensed frequency band, an unlicensed frequency band, or the both. Similarly, the uplink transmission may be performed over a licensed frequency band, an unlicensed frequency band, or the both.

Figure 4:
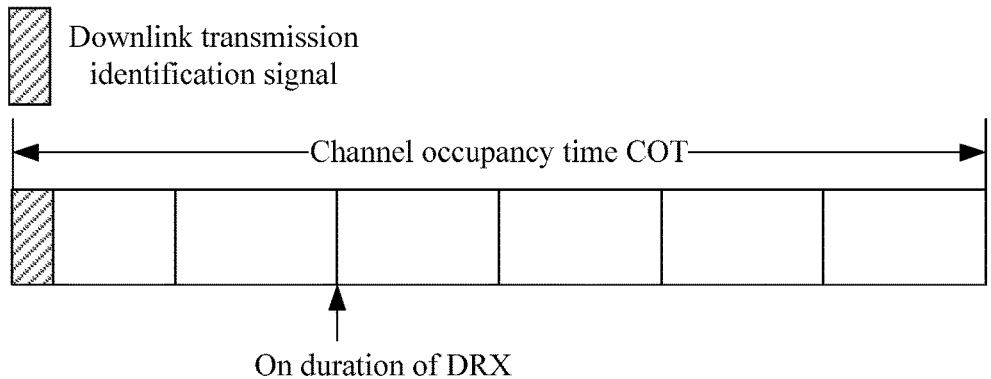
FIG. 4 illustrates a schematic diagram 2 of transmission mapping of downlink transmission identification signals.

An information transmission method according to an embodiment of the present disclosure is applied to a terminal. As shown in FIG. 4, the method includes the following steps:

Step 31. Receive configuration information of a downlink transmission identification signal, where the configuration information includes: a detection period and/or a detection position.

The detection period is used to indicate a size of a resource that the terminal needs to buffer, and the detection position is used to indicate a position where the terminal detects a downlink transmission identification signal. The configuration information may include either the detection period or the detection position, or both the detection period and the detection position. The detection period or detection position may be predefined or pre-configured. For example, the detection period set forth in a protocol is T, and in this case, the configuration information may include only the detection position.

Step 32. Detect a downlink transmission identification signal on a first time-domain transmission unit according to a detection period and/or a detection position indicated by the configuration information.

The time-domain transmission unit in the embodiment of the present disclosure may be a time-domain resource with a granularity of a frame (frame), a sub-frame, a slot (slot), and a time-domain symbol (such as an OFDM symbol) as a unit. The first time-domain transmission unit is one or more time-domain resources in one detection period of the terminal. The downlink transmission identification signal is used to that there is a downlink transmission in the network device. When there is a downlink transmission, the network device sends one or more downlink transmission identification signals to instruct the terminal that there is a downlink transmission.

Figure 3:
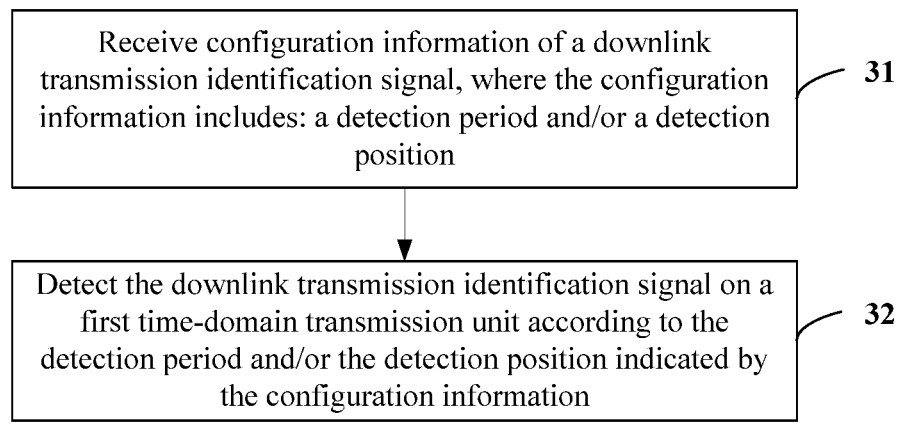
FIG. 3 illustrates a schematic flowchart of an information transmission method on a terminal side according to an embodiment of the present disclosure.

The transmission identification signal is added to a starting position of downlink transmission data. As shown in FIG. 3, in the case that the network device obtains a channel, a transmission identification signal is located at a starting position of downlink data burst, and the terminal triggers PDCCH blind decoding according to the transmission identification signal. However, in the case that the terminal fails to detect a transmission identification signal or an on duration (On duration) of discontinuous reception (DRX) configured by the terminal comes after the network device obtains channel occupancy time (COT), the terminal will lose data within the entire COT of the network device. It is worth pointing out that before or after step 32 of the embodiment of the present disclosure, the method may further include: buffering a received signal in the detection period in which the first time-domain transmission unit is located, and obtaining buffered data in the detection period. After the terminal detects the downlink transmission identification signal in the first time-domain transmission unit, it can be determined that the network device may have a downlink transmission before and after the first time-domain transmission unit, as the terminal buffer the data in the detection period in which the first time-domain transmission unit is located, data loss caused by missing a starting position of the downlink transmission can be avoided.

It is worth pointing out that there is no strict timing relationship between the foregoing step 32 and data buffering step. In a specific implementation, the data buffering step may come before or after step 32. In addition, the terminal may also buffer the data on the first time-domain transmission unit when detecting the downlink transmission identification signal on the first time-domain transmission unit.

The first time-domain transmission unit is a detection position, and the detection position is located at a specific position in the detection period, or the first time-domain transmission unit is any position in the detection period.

Specifically, when configuring the configuration information of the downlink transmission identification signal for the terminal, the network device may use the following two modes:

Mode 1. The configuration information configured by the network device includes a detection period T and a detection position of the downlink transmission identification signal, that is, the network device informs the terminal of an absolute candidate position where the downlink transmission identification signal may appear. In this mode, as the detection position is known, the terminal only needs to detect the downlink transmission identification signal at the detection position, that is, the foregoing first time-domain transmission unit is the detection position of the downlink transmission identification signal, and this detection position is a specific position in the detection period of the downlink transmission identification signal. It is worth pointing out that when the network device has a demand for sending a downlink transmission identification signal, the network device is expected to avoid the detection position when scheduling a resource for other information, to ensure the transmission of a necessary downlink transmission identification signal. For example, the detection period of the downlink transmission identification signal is T=4 slots, and the detection position (such as a slot number N_slot) satisfies N_slot mod T=2.

Mode 2. The configuration information configured by the network device only includes the detection period of the downlink transmission identification signal, for example, the detection period of the downlink transmission identification signal is T=4 slots. Specifically, by configuring the detection period T, the network device informs the terminal that downlink data of every T continuous time-domain transmission units contain at least one downlink transmission identification signal. It is worth pointing out that if a quantity of consecutive downlink data slots is less than T, one downlink transmission identification signal must be sent as well. In this mode, a position of sending the downlink transmission identification signal is flexible, which facilitate flexible resource allocation made by the network device. For the terminal, as the position for sending the downlink transmission identification signal is not fixed in this mode, the terminal needs to conduct downlink transmission identification signal detection on every time-domain transmission unit in the detection period, that is, the foregoing first time-domain transmission unit is any position in the detection period, and the terminal conduct the downlink transmission identification signal detection on every time-domain transmission unit in the detection period.

The above describes an implementation manner for the terminal to obtain the configuration information of the downlink transmission identification signal. The following embodiment of the present disclosure will further introduce a terminal action performed after the terminal conducts the downlink transmission identification signal detection.

After step 32, the following scenarios are also included:

Scenario 1. No downlink transmission identification signal is detected on the first time-domain transmission unit.

In this scenario, the terminal considers that there is no downlink transmission on the first time-domain transmission unit. Specifically, after step 32, the method further includes: skipping performing physical downlink control channel PDCCH blind decoding in the case that no downlink transmission identification signal is detected. Further, to avoid data loss, the terminal buffers the received signal in the detection period in which the first time-domain transmission unit is located to obtain buffered data of the detection period. When no downlink transmission identification signal is detected by the terminal, it can be determined that there is no downlink transmission, and in this case, the physical downlink control channel PDCCH blind decoding may not be conducted, and buffered data of a corresponding detection period is released. That means when no downlink transmission identification signal is detected by the terminal on the first time-domain transmission unit, the terminal skips performing PDCCH blind decoding on the first time-domain transmission unit. A detection position for a next detection on a downlink transmission identification signal made by the terminal may be determined according to the foregoing two modes. It is worth pointing out that the release of buffered data mentioned here may be the release of all buffered data or some of buffered data.

With respect to the foregoing Mode 1, the terminal performs the downlink transmission identification signal detection on the first time-domain transmission unit according to the configuration information in a state of receiving data, and the terminal buffers the received signal in the detection period T where the first time-domain transmission unit is located, to obtain buffered data of the detection period T. If the terminal fails to detect a downlink transmission identification signal on the first time-domain transmission unit, it is considered that there is no downlink transmission in the detection period T, the terminal skips performing PDCCH blind decoding, and continues the process of detecting a downlink transmission identification signal and buffering data. For the purpose of ensuring no data is lost, a detection position may be located at a last position of one detection period, that is, the terminal detects the downlink transmission identification signal on the first time-domain transmission unit, and buffers data on both the first time-domain transmission unit and the previous T−1 time-domain transmission units.

With respect to the foregoing mode 2, the terminal performs the downlink transmission identification signal detection on each time-domain transmission unit in the detection period T according to the configuration information in a state of receiving data. The first time-domain transmission unit is a position of current detection, and the terminal buffers received signals on both the position of current detection and the previous T−1 time-domain transmission units, to obtain buffered data corresponding to the detection period T, which may be understood as a time window with a fixed length and a sliding position. If the terminal fails to detect a downlink transmission identification signal on the first time-domain transmission unit, it is considered that there is no downlink transmission, the terminal skips performing PDCCH blind decoding, and continues the process of detecting a downlink transmission identification signal and buffering data. For the purpose of ensuring no data is lost, after buffering the data on the first time-domain transmission unit, the buffered data on the previous $T^{th}$ time-domain transmission unit may be released.

Figure 5:
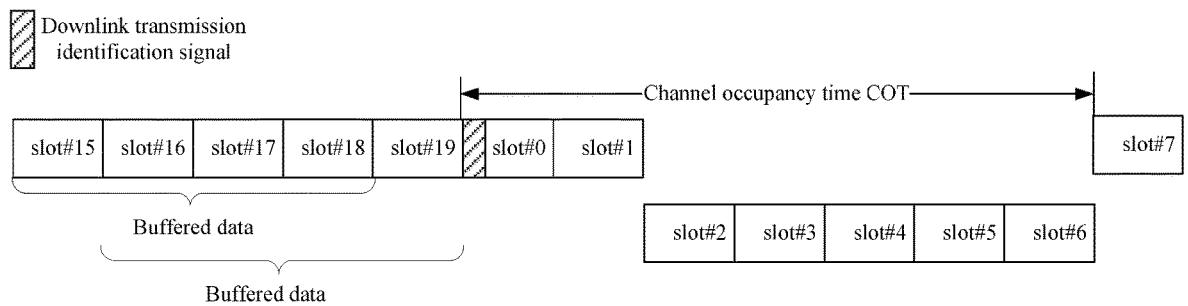
FIGS. 5-8 illustrate schematic diagrams of transmission mapping of downlink transmission identification signals in different scenarios according to an embodiment of the present disclosure.

As shown in FIG. 5, assuming that the configuration information in the foregoing mode 2 is used, that is, the position of the downlink transmission identification signal is flexible, the network device may adjust the position of the downlink transmission identification signal when it is necessary, for example, when uplink data needs to be scheduled on the first time-domain transmission unit in a DRX-on duration of the terminal, or the like. Taking a slot as an example, uplink data needs to be scheduled after the network device obtains COT information, and the downlink transmission identification signal must be sent in a scheduled slot #0 so that the terminal receives uplink scheduling information before transmitting the uplink data. For the terminal, due to the flexibility of the downlink transmission identification signal, the terminal needs to perform detection on each slot and perform data buffering for a sliding window. Assuming that the detection period T is 4 slots, the terminal buffers buffered data on slot #15, slot #16, slot #17, and slot #18 in a previous sub-frame before performing detection on slot #19 in the previous sub-frame. If the terminal fails to detect a downlink transmission identification signal on slot #19 of the previous sub-frame, the terminal buffers data on slot #19 and release the buffered data on slot #15, that is, the terminal slides the buffered data according to the length of the detection period.

Scenario 2. A downlink transmission identification signal is detected on the first time-domain transmission unit.

In this scenario, the terminal have behaviors of two aspects, one is to perform processing in the detection period where the first time-domain transmission unit is located, and the other one is to perform processing on a time-domain transmission unit after the first time-domain transmission unit. The terminal behaviors of these two aspects will be further described below.

The first aspect is to perform processing in the detection period where the first time-domain transmission unit is located.

In the embodiment of the present disclosure, the network device may carry indication information related to a downlink transmission in a downlink transmission identification signal. For example, the downlink transmission identification signal carries: first indication information used to indicate a starting position of channel occupancy time COT of the network device, and/or, second indication information used to indicate whether there is downlink data in a detection period. If indication information carried by the downlink transmission identification signal is different, the terminal's behavior of performing the PDCCH blind decoding may be different. The first indication information carried in the downlink transmission identification signal may refer to a starting position of COT indicated by the network device in the downlink transmission identification signal.

Next, the terminal's behavior of performing the PDCCH blind decoding on a time-domain transmission unit subsequent to the first time-domain transmission unit will be further described with reference to different indication information.

In the case that a downlink transmission identification signal carries first indication information used for indicating a starting position of channel occupancy time COT of the network device, the terminal performs, in the case of detecting the downlink transmission identification signal, PDCCH blind decoding in a detection period starting from a starting position indicated by the first indication information. The downlink transmission identification signal carries the first indication information, which means that the network device indicates the starting position of the COT in the downlink transmission identification signal. Correspondingly, after obtaining the starting position of the COT, the terminal performs the PDCCH blind decoding starting from the indicated starting position in the detection period.

Figure 6:
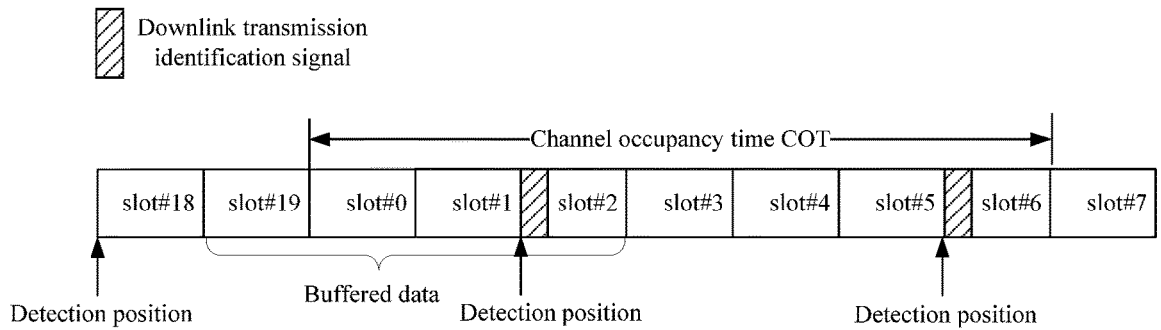

Assuming that Mode 1 is used, the detection period of the downlink transmission identification signal is T=4 slots, and a detection position N_slot satisfies N_slot mod T=2. As shown in FIG. 6, the network device obtains a channel in Slot #0 and starts a downlink transmission to Slot #6. The network device may send a downlink transmission identification signal in Slot #2 and Slot #6 according to an indication of configuration information. According to the configuration information, the terminal first detects whether there is a downlink transmission identification signal in Slot #18, and finds that there is no downlink transmission identification signal in Slot #18. The terminal further performs detection in Slot #2 and finds that there is a downlink transmission identification signal. At this time, the terminal has buffered data of Slot #19, Slot #0, Slot #1, and Slot #2. If first indication information carried in the downlink transmission identification signal indicates that a starting position of COT is Slot #0. Then the terminal learns from the first indication information that a downlink transmission starts from Slot #0, so the terminal only performs PDCCH blind decoding on buffered data of Slot #0, Slot #1, and Slot #2, without performing PDCCH blind decoding on data of Slot 19.

In the case that a downlink transmission identification signal carries second indication information used for indicating whether there is downlink data in a detection period and the terminal detects the downlink transmission identification signal, the terminal performs PDCCH blind decoding in the detection period in the case that the second indication information indicates that there is downlink data in the detection period; and the terminal skips performing the PDCCH blind decoding in the detection period in the case that the second indication information indicates that there is no downlink data in the detection period. Further, the terminal skips performing the PDCCH blind decoding in the detection period and releases buffered data in the detection period in the case that the terminal buffers a received signal in the detection period to obtain the corresponding buffered data and the second indication information indicates that there is no downlink data in the detection period. That means that the network device may carry second indication information in a downlink transmission identification signal sent currently, to indicate whether there is data scheduling for a terminal in the previous detection period.

An indication mode of the second indication information includes but is not limited to: using one indication bit to indicate whether there is data scheduling for a terminal in a detection period. For example, when a value of the indication bit is 1, it indicates that there is data scheduling for a terminal in a detection period, and when a value of the indication bit is 0, it indicates that there is no data scheduling for a terminal in a detection period; or vice versa. In this case, the terminal performs PDCCH blind decoding from a starting position of the detection period in the case that the terminal detects a downlink transmission identification signal, and the second indication information indicates that there is downlink data in the detection period; the terminal skips performing the PDCCH blind decoding in the detection period, and releases all buffered data in the case that the second indication information indicates that there is no downlink data in the detection period.

In addition, the indication mode of the second indication information may also include an indication bitmap used for indicating whether there is downlink scheduling data on each time-domain transmission unit in the detection period. For example, in the case that a value of a bit in the indication bitmap is 1, it indicates that there is terminal scheduling data on a corresponding time-domain transmission unit; in the case that a value of a bit in the indication bitmap is 0, it indicates that there is no terminal scheduling data on a corresponding time-domain transmission unit; or vice versa. Accordingly, the step of performing PDCCH blind decoding on buffered data includes: on a time-domain transmission unit on which there is downlink data indicated by the indication bitmap, performing the PDCCH blind decoding on the time-domain transmission unit on which there is downlink data in the detection period.

Figure 7:
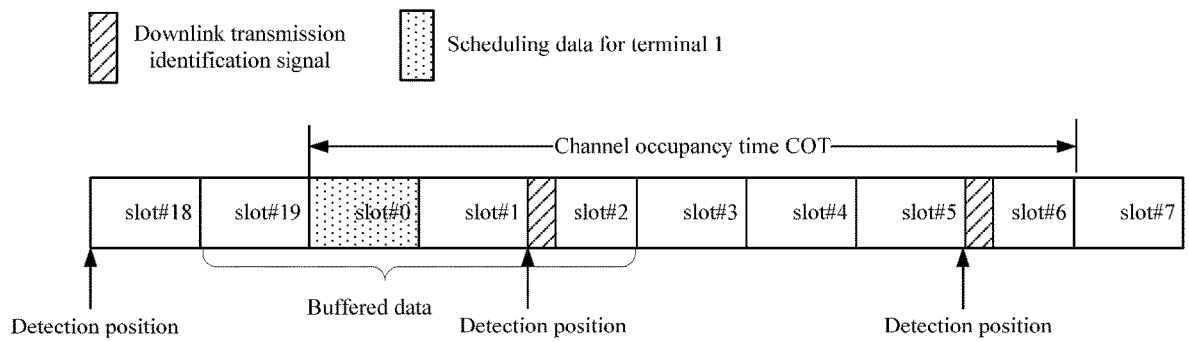

Further, assuming that Mode 1 is used, the detection period of the downlink transmission identification signal is T=4 slots, and a detection position N_slot satisfies N_slot mod T=2. As shown in FIG. 7, the network device obtains a channel in Slot #0 and starts a downlink transmission to Slot #6. The network device may send a downlink transmission identification signal in Slot #2 and Slot #6 according to an indication of configuration information. According to the configuration information, a terminal 1 and a terminal 2 first detect separately whether there is a downlink transmission identification signal in Slot #18, and find that there is no downlink transmission identification signal in Slot #18. The terminal 1 and the terminal 2 further perform detection in Slot #2 and find that there is a downlink transmission identification signal. At this time, the terminal 1 and the terminal 2 have buffered data of Slot #19, Slot #0, Slot #1, and Slot #2. If second indication information detected by the terminal 1 in the downlink transmission identification signal indicates that only Slot #0 has scheduling data, the terminal 1 only performs PDCCH blind decoding on Slot #0. If second indication information detected by the terminal 2 in the downlink transmission identification signal indicates that there is no data scheduling for the terminal 2 before, the terminal skips performing the PDCCH blind decoding on the buffered Slot #19, Slot #0, and Slot #1.

In addition, the downlink transmission identification signal in the embodiment of the present disclosure may not carry any information, and its function is only to remind the terminal that there is a downlink transmission. In this case, the terminal performs the PDCCH blind decoding from a starting position of buffered data after detecting the downlink transmission identification signal. That is, in the case that neither first indication information nor second indication information is detected, the PDCCH blind decoding is performed from the starting position of the buffered data. Assuming that Mode 1 is used, the detection period of the downlink transmission identification signal is T=4 Slots, and a detection position N_slot satisfies N_slot mod T=2. As shown in FIG. 7, the network device obtains a channel in Slot #0 and starts a downlink transmission to Slot #6. The network device may send a downlink transmission identification signal in Slot #2 and Slot #6 according to an indication of configuration information. According to the configuration information, a terminal 3 first detects whether there is a downlink transmission identification signal in Slot #18, and finds that there is no downlink transmission identification signal in Slot #18. The terminal further performs detection in Slot #2 and finds that there is a downlink transmission identification signal. At this time, the terminal 3 has buffered data of Slot #19, Slot #0, Slot #1, and Slot #2. If the terminal 3 fails to detect first indication information and second indication information in the downlink transmission identification signal, the terminal 3 performs PDCCH blind decoding on buffered Slot #19, Slot #0 and Slot #1.

The above describes a method for processing buffered data after a terminal detects a downlink transmission identification signal. This embodiment will further describe a PDCCH blind decoding method after a downlink transmission identification signal is detected.

The second aspect: perform processing subsequent to the first time-domain transmission unit.

After step 32, the method further includes: performing PDCCH blind decoding on a time-domain transmission unit subsequent to the first time-domain transmission unit in the case that a downlink transmission identification signal is detected. After the terminal detects a downlink transmission identification signal, it is considered that there is a downlink transmission, and in this case, the terminal performs PDCCH blind decoding on a subsequent time-domain transmission unit.

In the case of detecting the downlink transmission identification signal, the terminal triggers the PDCCH blind decoding on configured search space in the subsequent time-domain transmission unit. A condition for ending the PDCCH blind decoding includes but is not limited to the following modes:

In the case that the terminal obtains a COT ending position of the network device, the terminal stops performing PDCCH blind decoding subsequent to the COT ending position, and resumes only detecting a downlink transmission identification signal. Specifically, subsequent to the COT ending position of the network device, the terminal stops performing PDCCH blind decoding, and detects a downlink transmission identification signal.

The COT ending position is determined according to the downlink transmission identification signal. For example, the downlink transmission identification signal may also carry third indication information used for indicating the ending position of the channel occupancy time COT of the network device; or the downlink transmission identification signal carries first indication information used for indicating a COT starting position, and fourth indication information used for indicating a COT duration; or the downlink transmission identification signal carries first indication information, and a COT duration is predefined, for example, in a protocol. Assuming that Mode 1 is used, the detection period of the downlink transmission identification signal is T=4 Slots, and a detection position N_slot satisfies N_slot mod T=2. As shown in FIG. 6, the network device obtains a channel in Slot #0 and starts a downlink transmission to Slot #6. The network device may send a downlink transmission identification signal in Slot #2 and Slot #6 according to an indication of configuration information. According to the configuration information, the terminal first detects whether there is a downlink transmission identification signal in Slot #18, and finds that there is no downlink transmission identification signal in Slot #18. The terminal further performs detection in Slot #2 and finds that there is a downlink transmission identification signal. At this time, the terminal has buffered data of Slot #19, Slot #0, Slot #1, and Slot #2. If third indication information carried in the downlink transmission identification signal indicates that a starting position of COT is Slot #6. In this case, the terminal learns from the third indication information that the downlink transmission ends at Slot #6, so the terminal stops performing the PDCCH blind decoding starting from Slot #7, and resumes the process of detecting a downlink transmission identification signal.

Figure 8:
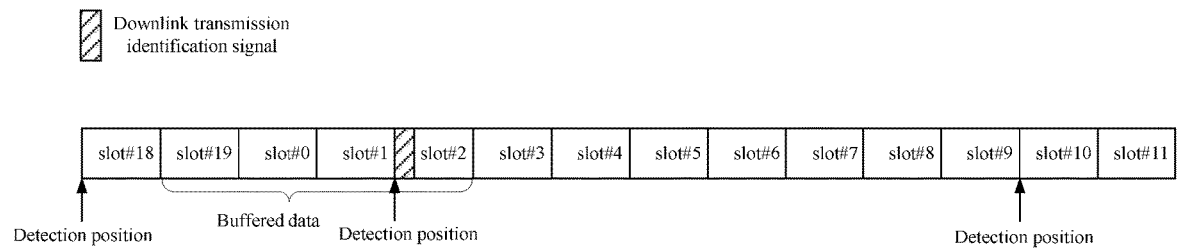

If the terminal fails to obtain a COT ending position of the network device, the terminal may start a counter (such as a PDCCH blind decoding counter) after starting the PDCCH blind decoding. After PDCCH blind decoding is performed on one time-domain transmission unit, the counter will add 1 or subtract 1. Specifically, the terminal starts the PDCCH blind decoding counter, where the PDCCH blind decoding counter is used to count a quantity of PDCCH blind decoding times; and when the PDCCH blind decoding counter reaches a preset threshold or returns to zero, the terminal stops performing the PDCCH blind decoding, and detect a downlink transmission identification signal. Assuming that Mode 1 is used, the detection period of the downlink transmission identification signal is T=4 slots, and a detection position N_slot satisfies N_slot mod T=2. As shown in FIG. 8, the network device obtains a channel in Slot #0 and starts a downlink transmission to Slot #6. The network device may send a downlink transmission identification signal in Slot #2 and Slot #6 according to an indication of configuration information. According to the configuration information, the terminal first detects whether there is a downlink transmission identification signal in Slot #18, and finds that there is no downlink transmission identification signal in Slot #18. The terminal further performs detection in Slot #2 and finds that there is a downlink transmission identification signal. At this time, the terminal starts PDCCH blind decoding on subsequent Slot (that is, Slot 3, Slot 4, . . . ). At this time a COT ending position is unknown to the terminal, the terminal may start the PDCCH blind decoding counter, counter=8. The counter is reduced by one every time the terminal performs PDCCH blind decoding on each slot. The terminal stops the PDCCH blind decoding at Slot #10 and resumes the process of detecting a downlink identification signal.

It is worth pointing out that the downlink transmission identification signal mentioned in the embodiment of the present disclosure may include one or more of a channel state information reference signal (CSI-RS), a demodulation reference signal (DMRS), a primary synchronization signal (PSS), a secondary synchronization signal (SSS) and a group common physical downlink control channel (GC-PDCCH), and another possible signal. The detection complexity of these signals is lower than the complexity of PDCCH blind decoding, which can effectively reduce power consumption of the terminal.

Further, the indication information carried in the downlink transmission identification signal in the embodiment of the present disclosure may be downlink control information (DCI), and different indication information may be implemented through different indicator fields in the DCI.

In the information transmission method according to the embodiment of the present disclosure, the terminal detects the downlink transmission identification signal on the first time-domain transmission unit in the detection period, and buffers the buffered data in the detection period. In this case, when the downlink transmission identification signal is detected, the buffered data in the detection period is buffered, and downlink data in the detection period is obtained by detecting the buffered data, so no downlink data will be lost due to missing the COT starting position.

The information transmission methods in different scenarios are described in detail in the foregoing embodiment. A terminal corresponding to the method is further described in the following embodiment with reference to the accompanying drawings.

Figure 9:
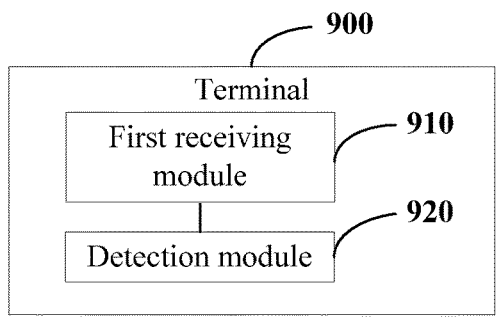
FIG. 9 illustrates a schematic structural diagram of a module of a terminal according to an embodiment of the present disclosure.

As shown in FIG. 9, a terminal 900 according to an embodiment of the present disclosure can implement receiving the configuration information of the downlink transmission identification signal in the foregoing embodiment, where the configuration information includes: a detection period and/or a detection position. A downlink transmission identification signal is detected on a first time-domain transmission unit according to a detection period and/or a detection position indicated by the configuration information. The terminal 900 specifically includes the following function modules:

a first receiving module 910, configured to receive configuration information of a downlink transmission identification signal, where the configuration information includes: a detection period and/or a detection position; and a detecting module 920, configured to detect a downlink transmission identification signal on a first time-domain transmission unit according to a detection period and/or a detection position indicated by the configuration information.

The first time-domain transmission unit is a detection position, and the detection position is located at a specific position in the detection period, or the first time-domain transmission unit is any position in the detection period.

The terminal 900 further includes:

a first processing module, configured to skip performing physical downlink control channel PDCCH blind decoding in the case that no downlink transmission identification signal is detected.

The downlink transmission identification signal carries: first indication information used to indicate a starting position of channel occupancy time COT of the network device, and/or, second indication information used to indicate whether there is downlink data in a detection period.

The terminal 900 further includes:

a second processing module, configured to perform at least one of the following operations in the case that a downlink transmission identification signal is detected:

performing PDCCH blind decoding in a detection period starting from a starting position indicated by the first indication information;

performing PDCCH blind decoding in a detection period in the case that the second indication information indicates that there is downlink data in the detection period;

skipping performing PDCCH blind decoding on buffered data in the case that the second indication information indicates that there is no downlink data in the detection period; and performing PDCCH blind decoding starting from a starting position of a detection period in the case that neither the first indication information nor the second indication information is detected.

The second indication information includes an indication bitmap used for indicating whether there is downlink scheduling data on each time-domain transmission unit in the detection period.

The second processing module includes a first processing sub-module, configured to perform, on a time-domain transmission unit on which there is downlink data indicated by the indication bitmap, PDCCH blind decoding on the time-domain transmission unit on which there is downlink data in the detection period.

The terminal 900 further includes:

a third processing module, configured to perform PDCCH blind decoding on a time-domain transmission unit subsequent to the first time-domain transmission unit in the case that a downlink transmission identification signal is detected.

The terminal 900 further includes:

a fourth processing module, configured to stop performing PDCCH blind decoding subsequent to the COT ending position of the network device, and detect a downlink transmission identification signal.

The ending position is determined according to the downlink transmission identification signal.

The terminal 900 further includes:

a starting module, configured to start a PDCCH blind decoding counter, where the PDCCH blind decoding counter is configured to count a quantity of PDCCH blind decoding times; and a fifth processing module, configured to stop performing the PDCCH blind decoding when the PDCCH blind decoding counter reaches a preset threshold or returns to zero, and detect a downlink transmission identification signal.

It is worth pointing out that the terminal according to the embodiment of the present disclosure detects the downlink transmission identification signal on the first time-domain transmission unit in the detection period, and buffers the buffered data in the detection period. In this case, when the downlink transmission identification signal is detected, the buffered data in the detection period is buffered, and downlink data in the detection period is obtained by detecting the buffered data, so no downlink data will be lost due to missing the COT starting position.

Figure 10:
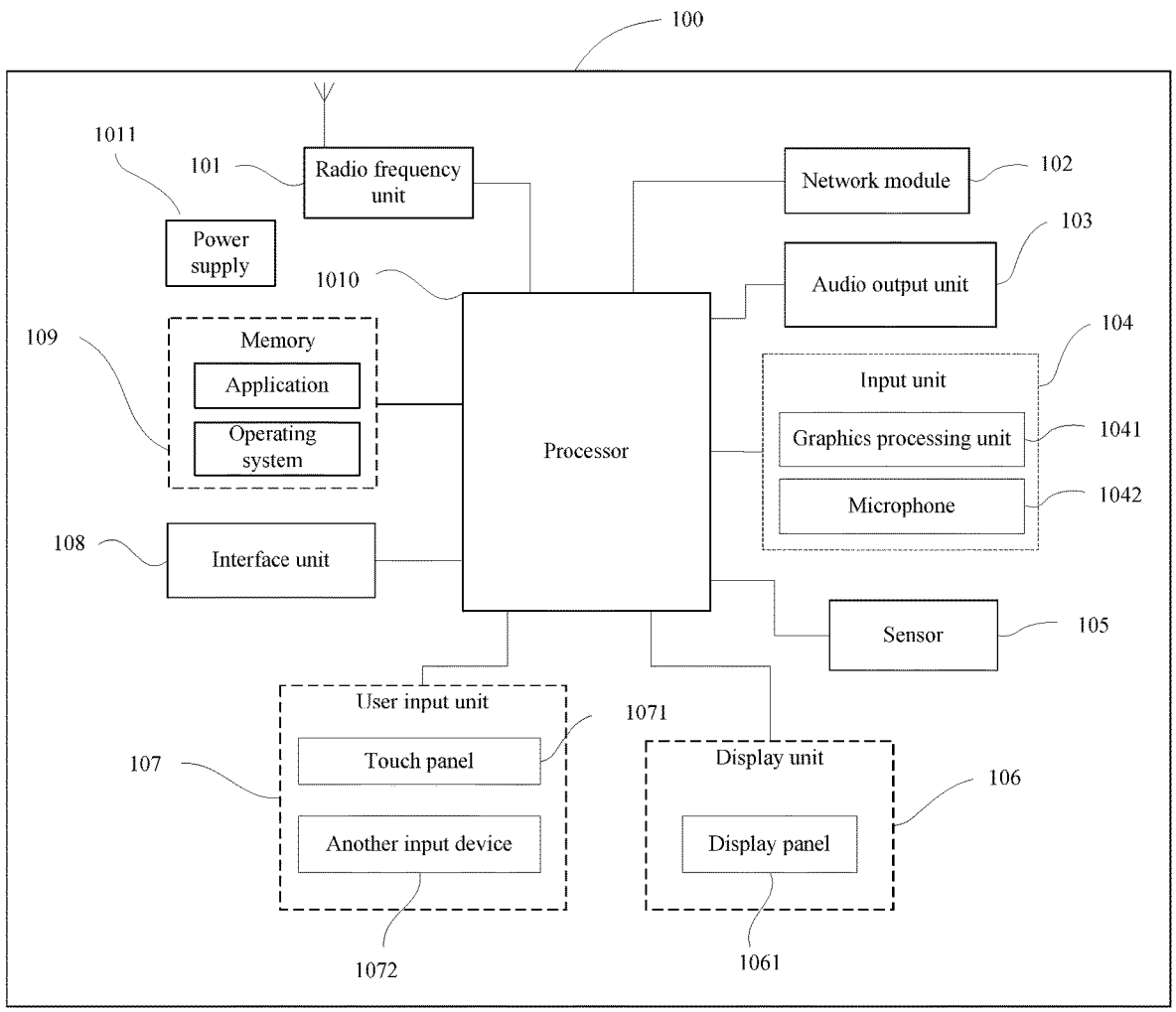
FIG. 10 illustrates a block diagram of a terminal according to an embodiment of the present disclosure.

To better achieve the foregoing objective, further, FIG. 10 is a schematic structural diagram of hardware of a terminal for implementing the various embodiments of this disclosure. The terminal 100 includes, but is not limited to: components such as a radio frequency unit 101, a network module 102, an audio output unit 103, an input unit 104, a sensor 105, a display unit 106, a user input unit 107, an interface unit 108, a memory 109, a processor 1010, and a power supply 1011. A person skilled in the art may understand that the structure of the terminal shown in FIG. 10 does not constitute a limitation to the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 101 is configured to transceive data under the control of the processor 1010.

The processor 1010 is configured to detect a downlink transmission identification signal on a first time-domain transmission unit; and buffer buffered data of a detection period where the first time-domain transmission unit is located.

The terminal according to the embodiment of the present disclosure detects the downlink transmission identification signal on the first time-domain transmission unit in the detection period, and buffers the buffered data in the detection period. In this case, when the downlink transmission identification signal is detected, the buffered data in the detection period is buffered, and downlink data in the detection period is obtained by detecting the buffered data, so no downlink data will be lost due to missing the COT starting position.

It should be understood that, in embodiments of the present disclosure, the radio frequency unit 101 may be configured to receive and send information or receive and send a signal in a call process. Specifically, after receiving downlink data from a base station, the radio frequency unit 101 sends the downlink data to the processor 1010 for processing. In addition, the radio frequency unit 101 sends uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may communicate with a network and another device by using a wireless communications system.

The terminal provides a user with wireless broadband Internet access by using the network module 102, for example, helping the user send and receive emails, browse web pages, and access streaming media.

The audio output unit 103 may convert audio data received by the radio frequency unit 101 or the network module 102 or stored in the memory 109 into an audio signal and output the audio signal as a sound. In addition, the audio output unit 103 may further provide audio output (for example, call signal receiving sound or message receiving sound) related to a specific function performed by the terminal 100. The audio output unit 103 includes a loudspeaker, a buzzer, a receiver, and the like.

The input unit 104 is configured to receive audio or video signals. The input unit 104 may include a graphics processing unit (GPU) 1041 and a microphone 1042. The graphics processing unit 1041 processes image data of a static picture or a video obtained by an image capturing apparatus (for example, a camera) in a video capturing mode or an image capturing mode. A processed image frame can be displayed on the display unit 106. The image frame processed by the graphics processing unit 1041 may be stored in the memory 109 (or another storage medium) or sent via the radio frequency unit 101 or the network module 102. The microphone 1042 can receive sound, and can process such sound into audio data. The audio data obtained through processing may be converted, in a telephone call mode, into a format that can be sent to a mobile communications base station via the radio frequency unit 101 for output.

The terminal 100 further includes at least one sensor 105, such as a light sensor, a motion sensor, and another sensor. Specifically, the light sensor includes an ambient light sensor and a proximity sensor, where the ambient light sensor can adjust brightness of a display panel 1061 based on brightness of ambient light, and the proximity sensor can turn off the display panel 1061 and/or backlight when the terminal 100 is moved towards the ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 105 may further include a fingerprint sensor, a pressure sensor, an iris sensor, a molecular sensor, a gyroscope, a barometer, a hygrometer, a thermometer, an infrared sensor, and the like. This is not described herein.

The display unit 106 is configured to display information entered by a user or information provided for a user. The display unit 106 may include the display panel 1061, and the display panel 1061 may be configured in a form of a liquid crystal display (LCD), an organic light-emitting diode (OLED), or the like.

The user input unit 107 may be configured to receive input numeral or character information, and generate key signal input related to user setting and functional control of the terminal. Specifically, the user input unit 107 includes a touch panel 1071 and another input device 1072. The touch panel 1071, also known as a touchscreen, can collect a touch operation performed by a user on or near the touch panel 1071 (for example, an operation performed by the user on the touch panel 1071 or near the touch panel 1071 by using any suitable object or accessory such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 1010, and receives and executes a command sent by the processor 1010. In addition, the touch panel 1071 can be implemented in various types such as resistive, capacitive, infrared, and surface acoustic waves. The user input unit 107 may further include another input device 1072 in addition to the touch panel 1071. Specifically, the another input device 1072 may include, but is not limited to, a physical keyboard, function keys (such as a volume control key and a switch key), a trackball, a mouse, and a joystick. Details are not described herein.

Further, the touch panel 1071 may cover the display panel 1061. When detecting the touch operation on or near the touch panel 1071, the touch panel 1071 transmits the touch operation to the processor 1010 to determine a type of a touch event, and then the processor 1010 provides corresponding visual output on the display panel 1061 based on the type of the touch event. In FIG. 10, the touch panel 1071 and the display panel 1061 are used as two independent components to implement input and output functions of the terminal. However, in some embodiments, the touch panel 1071 and the display panel 1061 may be integrated to implement the input and output functions of the terminal. This is not specifically limited herein.

The interface unit 108 is an interface connecting an external apparatus to the terminal 100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 108 may be configured to receive an input (for example, data information or power) from an external apparatus and transmit the received input to one or more elements in the terminal 100, or transmit data between the terminal 100 and the external apparatus.

The memory 109 may be configured to store software programs and various data. The memory 109 may mainly include a program storage area and a data storage area. The program storage area may store an operating system, an application required by at least one function (for example, an audio playing function and an image playing function), and the like. The data storage area may store data (for example, audio data and an address book) created according to use of the mobile phone. In addition, the memory 109 may include a high speed random access memory, and may further include a non-volatile memory, for example, at least one magnetic disk memory device, a flash memory device, or another volatile solid state memory device.

The processor 1010 is a control center of the terminal, and connects all parts of the entire terminal by using various interfaces and lines. By running or executing a software program and/or a module stored in the memory 109 and invoking data stored in the memory 109, the processor 1010 performs various functions of the terminal and data processing, to perform overall monitoring on the terminal. The processor 1010 can include one or more processing units. Preferably, the processor 1010 can be integrated with an application processor and a modem processor. The application processor mainly processes the operating system, the user interface, applications, etc. The modem processor mainly processes wireless communication. It may be understood that the modem processor may not be integrated into the processor 1010.

The terminal 100 may further include the power supply 1011 (such as a battery) that supplies power to each component. Preferably, the power supply 1011 may be logically connected to the processor 1010 by using a power management system, so as to implement functions such as charging, discharging, and power consumption management by using the power management system.

In addition, the terminal 100 includes some function modules not shown, and details are not described herein.

Preferably, an embodiment of the present disclosure further provides a terminal, including a processor 1010, a memory 109, and a computer program that is stored in the memory 109 and that can run on the processor 1010. When the computer program is executed by the processor 1010, processes of the foregoing information transmission method embodiment are implemented, and a same technical effect can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit (Subscriber Unit), a subscriber station (Subscriber Station), a mobile station (Mobile Station), a mobile (Mobile), a remote station (Remote Station), a remote terminal (Remote Terminal), an access terminal (Access Terminal), a user terminal (User Terminal), a user agent (User Agent), or a user device (User Device or User Equipment), which is not limited herein.

An embodiment of the present disclosure further provides a computer-readable storage medium, with a computer program stored thereon, where when the computer program is executed by a processor, the processes of the embodiment of the foregoing information transmission method are implemented, with the same technical effects achieved. To avoid repetition, details are not described again herein. The computer readable storage medium may be a read-only memory (ROM), a random access memory (RAM), a magnetic disk, a compact disc, or the like.

The foregoing embodiment describes the information transmission method of the present disclosure on the terminal side. The following embodiment further describes an information transmission method on a network device side with reference to the accompanying drawings.

Figure 11:
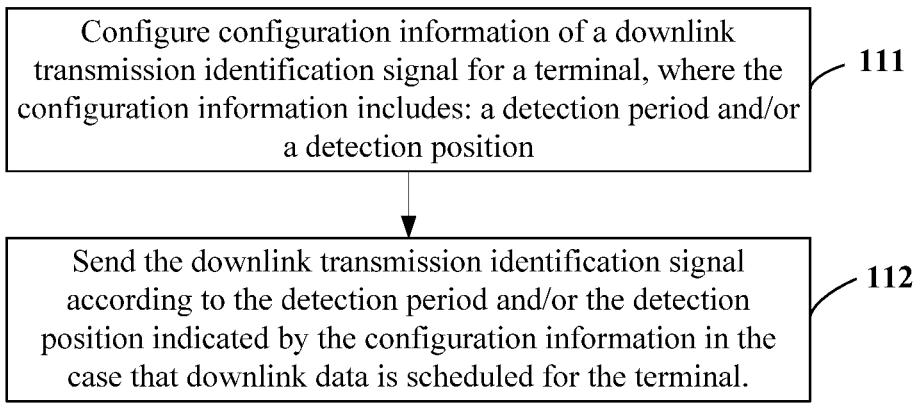
FIG. 11 illustrates a schematic flowchart of an information transmission method by a network device according to an embodiment of the present disclosure.

As shown in FIG. 11, an information transmission method according to an embodiment of the present disclosure is applied to a network device side, and includes the following steps:

Step 111. Configure configuration information of a downlink transmission identification signal for a terminal, where the configuration information includes: a detection period and/or a detection position.

The configuration information includes: a detection period and/or a detection position, where the detection position is located at a specific position in the detection period, or the detection position is located at any position in the detection period.

The configuration information configured by the network device may include a detection period T and a detection position of a downlink transmission identification signal, that is, the network device informs the terminal of an absolute candidate position where the downlink transmission identification signal may appear. In this mode, as the detection position is known, the terminal only needs to detect the downlink transmission identification signal at the detection position.

Step 112. Send the downlink transmission identification signal according to a detection period and/or a detection position indicated by the configuration information in the case that downlink data is scheduled for the terminal.

The downlink data scheduled at one time corresponds to one or more downlink transmission identification signals, and a specific quantity correspondence may be determined according to an attribute of the downlink data. For example, when downlink data of a certain scheduling is of high importance, multiple downlink transmission identification signals may be dispensed for this scheduling.

In addition, the configuration information configured by the network device may also include only the detection period of the downlink transmission identification signal, for example, the detection period of the downlink transmission identification signal is T=4 slots. Specifically, by configuring the detection period T, the network device informs the terminal that downlink data of every T continuous time-domain transmission units contain at least one downlink transmission identification signal. It is worth pointing out that if a quantity of consecutive downlink data slots is less than T, one downlink transmission identification signal must be sent as well. In this mode, a position of sending the downlink transmission identification signal is flexible, which facilitates flexible resource allocation made by the network device. For the terminal, as the position for sending the downlink transmission identification signal is not fixed in this mode, the terminal needs to conduct downlink transmission identification signal detection on every time-domain transmission unit in the detection period.

In the embodiment of the present disclosure, the network device may carry indication information related to a downlink transmission in a downlink transmission identification signal. For example, the downlink transmission identification signal carries: first indication information used to indicate a starting position of channel occupancy time COT of the network device, and/or, second indication information used to indicate whether there is downlink data in a detection period. In addition, the downlink transmission identification signal may also carry third indication information used for indicating an ending position of channel occupancy time COT of the network device.

The indication mode of the second indication information includes but is not limited to: using one indication bit to indicate whether there is data scheduling for a terminal in buffered data. For example, when a value of the indication bit is 1, it indicates that there is data scheduling for a terminal in buffered data, and when a value of the indication bit is 0, it indicates that there is no data scheduling for a terminal in buffered data; or vice versa.

In addition, the indication mode of the second indication information may also include an indication bitmap used for indicating whether there is downlink scheduling data on each time-domain transmission unit in the detection period. For example, in the case that a value of a bit in the indication bitmap is 1, it indicates that there is terminal scheduling data on a corresponding time-domain transmission unit; in the case that a value of a bit in the indication bitmap is 0, it indicates that there is no terminal scheduling data on a corresponding time-domain transmission unit; or vice versa.

It is worth pointing out that the downlink transmission identification signal mentioned in the embodiment of the present disclosure may include one or more of various possible signals such as CSI-RS, DMRS, PSS, SSS and GC-PDCCH. The indication information carried in the downlink transmission identification signal may be DCI, and different indication information may be implemented through different indicator fields in DCI.

In the information transmission method according to the embodiment of the present disclosure, when there is a demand for a downlink transmission, the network device may send downlink transmission identification information on one time-domain transmission unit in a detection period without sending downlink transmission identification information on every time-domain transmission unit, thus lowering system overhead and improving system throughput.

The information transmission methods in different scenarios are separately described in detail in the foregoing embodiment. A network device corresponding to the method is further described in the following embodiment with reference to the accompanying drawings.

Figure 12:
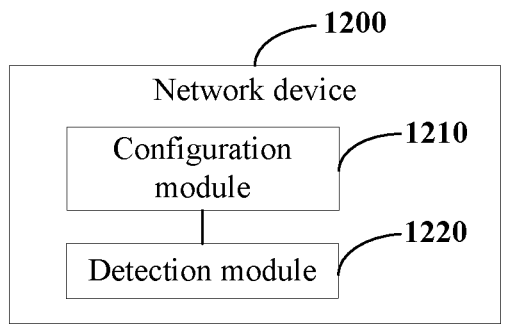
FIG. 12 illustrates a schematic structural diagram of a module of a network device according to an embodiment of the present disclosure.

As shown in FIG. 12, a network device 1200 according to an embodiment of the present disclosure can implement the configuration information of the downlink transmission identification signal configured for the terminal in the foregoing embodiment, where the configuration information includes: a detection period and/or a detection position. In the case that downlink data is scheduled for the terminal, the downlink transmission identification signal is sent according to the detection period and/or detection position indicated by the configuration information. The network device 1200 specifically includes the following function modules:

a configuring module 1210, configured to configure configuration information of a downlink transmission identification signal for a terminal, where the configuration information includes: a detection period and/or a detection position; and a sending module 1220, configured to send the downlink transmission identification signal according to a detection period and/or a detection position indicated by the configuration information in the case that downlink data is scheduled for the terminal.

The detection position is located at a specific position in the detection period, or the detection position is located at any position in the detection period.

The downlink transmission identification signal carries: first indication information used to indicate a starting position of channel occupancy time COT of the network device, and/or, second indication information used to indicate whether there is downlink data in a detection period.

The second indication information includes an indication bitmap used for indicating whether there is downlink scheduling data on each time-domain transmission unit in the detection period.

It is worth pointing out that when the network device according to the embodiment of the present disclosure has a demand for a downlink transmission, the network device may send downlink transmission identification information on one time-domain transmission unit in a detection period without sending downlink transmission identification information on every time-domain transmission unit, thus lowering system overhead and improving system throughput.

It should be noted that, division of the modules of the network device and the terminal is merely logical function division, and in actual implementation, the modules may be all or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementation of another module is similar thereto. In addition, all or some of these modules may be integrated together or implemented independently. The processing element herein may be an integrated circuit having a signal processing capability. During implementation, the steps of the foregoing method or the foregoing modules can be completed by hardware integrated logic circuits in the processor element or instructions in the form of software.

For example, the modules may be configured as one or more integrated circuits for implementing the foregoing method, for example, one or more application specific integrated circuits (ASIC), one or more microprocessors (DSP), or one or more field programmable gate arrays (FPGA). For another example, when a module above is implemented by invoking program code by using a processing element, the processing element may be a general-purpose processor, for example, a central processing unit (CPU) or another processor that can invoke program code. For another example, these modules may be integrated together, and implemented in a form of a system-on-a-chip (SOC).

To better achieve the foregoing objective, an embodiment of the present disclosure further provides a network device, including a processor, a memory, and a computer program stored in the memory and capable of running on the processor, where steps of the foregoing information transmission method are implemented in the case that the computer program is executed by the processor. An embodiment of the present invention further provides a computer-readable storage medium, with a computer program stored thereon, where steps of the foregoing information transmission method are implemented in the case that the computer program is executed by a processor.

Figure 13:
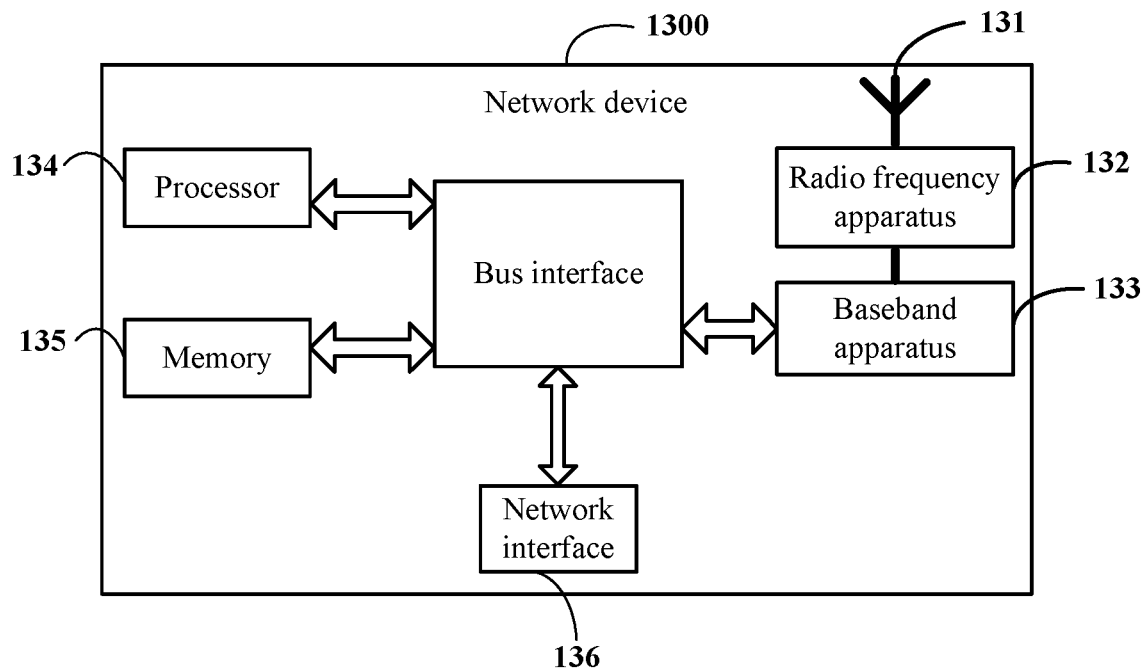
FIG. 13 illustrates a block diagram of a network device according to an embodiment of the present disclosure.

Specifically, an embodiment of the present disclosure further provides a network device. As shown in FIG. 13, a network device 1300 includes: an antenna 131, a radio frequency apparatus 132, and a baseband apparatus 133. The antenna 131 is connected to the radio frequency apparatus 132. In the uplink direction, the radio frequency apparatus 132 receives information through the antenna 131, and sends the received information to the baseband apparatus 133 for processing. In the downlink direction, the baseband apparatus 133 processes information to be sent and sends the information to the radio frequency apparatus 132, and the radio frequency apparatus 132 processes the received information and then sends the information through the antenna 131.

The foregoing band processing apparatus may be located in the baseband apparatus 133, and the method performed by the network device in the foregoing embodiment may be implemented in the baseband apparatus 133. The baseband apparatus 133 includes a processor 134 and a memory 135.

The baseband apparatus 133 may include, for example, at least one baseband board, and a plurality of chips are arranged on the baseband board. As shown in FIG. 13, one of the chips is, for example, the processor 134, which is connected to the memory 135, to invoke a program in the memory 135, so as to perform the operations of the network device shown in the foregoing method embodiment.

The baseband apparatus 133 may further include a network interface 136, configured to exchange information with the radio frequency apparatus 132. For example, the interface is a common public radio interface (CPRI).

The processor herein may be a single processor, or may be a collective term for a plurality of processing elements. For example, the processor may be a CPU or an ASIC, or may be one or more integrated circuits that are configured to implement the foregoing method performed by the network device, for example, may be one or more microprocessors DSPs, or one or more field programmable gate arrays FPGAs. The storage element may be one memory or a collective term for a plurality of storage elements.

The memory 135 may be a volatile memory or a non-volatile memory, or may include both a volatile memory and a non-volatile memory. The non-volatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 135 described in this application is intended to include but not limited to these and any other suitable types of memories.

Specifically, the network device in this embodiment of this disclosure further includes a computer program stored in the memory 135 and executable on the processor 134, and the processor 134 invokes the computer program in the memory 135 to perform the method performed by the modules shown in FIG. 12.

Specifically, when the computer program is called by the processor 134, it may be used to perform: sending a downlink transmission identification signal on a time-domain transmission unit in a detection period in the case that downlink data is scheduled for a terminal.

When the network device according to the embodiment of the present disclosure has a demand for a downlink transmission, the network device may send downlink transmission identification information on one time-domain transmission unit in a detection period without sending downlink transmission identification information on every time-domain transmission unit, thus lowering system overhead and improving system throughput.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed operating process of the foregoing system, apparatus, and unit, refer to a corresponding process in the foregoing method embodiments. Details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer-readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

In addition, it should be noted that in the apparatuses and methods of the present disclosure, it is obvious that the components or the steps may be divided and/or recombined. These divisions and/or recombinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any steps or components of the method and apparatus in the present disclosure may be implemented by hardware, firmware, software, or a combination thereof in any computing apparatus (including a processor, a storage medium, and the like) or a network of a computing apparatus. This can be implemented as long as those of ordinary skill in the art apply basic programming skill after reading the description of the present disclosure.

Therefore, the objective of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes this disclosure, and a storage medium storing such a program product also constitutes this disclosure. Obviously, the storage medium may be any well-known storage medium or any storage medium to be developed in the future. It should also be noted that in the apparatus and method of the present disclosure, apparently, the components or steps may be divided and/or recombined. These divisions and/or recombinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

The above embodiments are preferred embodiments of the present disclosure. It should be noted that, within the technical concept of the present disclosure, those ordinarily skilled in the art can make various improvements and modifications, which shall all fall within the protective scope of the present disclosure.

The invention claimed is:

1. An information transmission method, applied to a terminal, comprising:
  receiving configuration information of a downlink transmission identification signal, wherein the configuration information comprises: a detection period and/or a detection position; and
  detecting the downlink transmission identification signal on a first time-domain transmission unit according to the detection period and/or a detection position indicated by the configuration information;
  wherein after the step of detecting the downlink transmission identification signal on a first time-domain transmission unit, the method further comprises:
  skipping performing physical downlink control channel (PDCCH) blind decoding in the case that no downlink transmission identification signal is detected.

2. The information transmission method according to claim 1, wherein the first time-domain transmission unit is the detection position, and the detection position is located at a specific position in the detection period, or the first time-domain transmission unit is any position in the detection period.

3. The information transmission method according to claim 1, wherein the downlink transmission identification signal carries: first indication information used for indicating a starting position of channel occupancy time (COT) of a network device, and/or second indication information used for indicating whether there is downlink data in the detection period.

4. The information transmission method according to claim 3, wherein after the step of detecting the downlink transmission identification signal on a first time-domain transmission unit, the method further comprises:
  performing at least one of the following operations in the case that the downlink transmission identification signal is detected:
  performing PDCCH blind decoding in the detection period starting from a starting position indicated by the first indication information;
  performing PDCCH blind decoding in the detection period in the case that the second indication information indicates that there is downlink data in the detection period;
  skipping performing PDCCH blind decoding in the detection period in the case that the second indication information indicates that there is no downlink data in the detection period; and
  performing PDCCH blind decoding starting from a starting position of the detection period in the case that neither the first indication information nor the second indication information is detected.

5. The information transmission method according to claim 4, wherein the second indication information comprises an indication bitmap used for indicating whether there is downlink scheduling data on each time-domain transmission unit in the detection period;

wherein the step of performing PDCCH blind decoding in the detection period comprises:
    performing, on a time-domain transmission unit on which there is downlink data indicated by the indication bitmap, PDCCH blind decoding on a time-domain transmission unit on which there is downlink data in the detection period.

6. The information transmission method according to claim 1, wherein after the step of detecting the downlink transmission identification signal on a first time-domain transmission unit, the method further comprises:
    performing PDCCH blind decoding on a time-domain transmission unit subsequent to the first time-domain transmission unit in the case that the downlink transmission identification signal is detected.

7. The information transmission method according to claim 6, wherein after the step of performing PDCCH blind decoding, the method further comprises:
    subsequent to an ending position of COT of a network device, stopping PDCCH blind decoding, and detecting a downlink transmission identification signal.

8. The information transmission method according to claim 7, wherein the ending position is determined according to the downlink transmission identification signal.

9. The information transmission method according to claim 6, wherein after the step of performing PDCCH blind decoding, the method further comprises:
    starting a PDCCH blind decoding counter, wherein the PDCCH blind decoding counter is configured to count a quantity of PDCCH blind decoding times;
    in the case that the PDCCH blind decoding counter reaches a preset threshold or returns to zero, stopping PDCCH blind decoding, and detecting a downlink transmission identification signal.

10. A terminal, comprising a processor, a memory, and a computer program that is stored in the memory and that can run on the processor, wherein in the case that the computer program is executed by the processor, the processor is configured to implement following steps:
    receiving configuration information of a downlink transmission identification signal, wherein the configuration information comprises: a detection period and/or a detection position; and
    detecting the downlink transmission identification signal on a first time-domain transmission unit according to the detection period and/or a detection position indicated by the configuration information;
    wherein after the step of detecting the downlink transmission identification signal on a first time-domain transmission unit, the processor is further configured to implement following steps:
    skipping performing physical downlink control channel (PDCCH) blind decoding in the case that no downlink transmission identification signal is detected.

11. The terminal according to claim 10, wherein the first time-domain transmission unit is the detection position, and the detection position is located at a specific position in the detection period, or the first time-domain transmission unit is any position in the detection period.

12. The terminal according to claim 10, wherein the downlink transmission identification signal carries: first indication information used for indicating a starting position of channel occupancy time (COT) of a network device, and/or second indication information used for indicating whether there is downlink data in the detection period.

13. The terminal according to claim 12, wherein after the step of detecting the downlink transmission identification signal on a first time-domain transmission unit, the processor is further configured to implement following steps;
    performing at least one of the following operations in the case that the downlink transmission identification signal is detected;
    performing PDCCH blind decoding in the detection period starting from a starting position indicated by the first indication information;
    performing PDCCH blind decoding in the detection period in the case that the second indication information indicates that there is downlink data in the detection period;
    skipping performing PDCCH blind decoding in the detection period in the case that the second indication information indicates that there is no downlink data in the detection period; and
    performing PDCCH blind decoding starting from a starting position of the detection period in the case that neither the first indication information nor the second indication information is detected.

14. An information transmission method, applied to a network device side, and comprising:
    configuring configuration information of a downlink transmission identification signal for a terminal, wherein the configuration information comprises: a detection period and/or a detection position; and
    sending a downlink transmission identification signal according to a detection period and/or a detection position indicated by the configuration information in the case that downlink data is scheduled for a terminal;
    wherein the downlink transmission identification signal is used to indicate the terminal to skip performing physical downlink control channel (PDCCH) blind decoding in the case that no downlink transmission dentification signal is detected.

15. The information transmission method according to claim 14, wherein the detection position is located at a specific position in the detection period, or the detection position is located at any position in the detection period.

16. The information transmission method according to claim 14, wherein the downlink transmission identification signal carries: first indication information used for indicating a starting position of channel occupancy time (COT) of a network device, and/or second indication information used for indicating whether there is downlink data in the detection period.

17. The information transmission method according to claim 16, wherein the second indication information comprises an indication bitmap used for indicating whether there is downlink scheduling data on each time-domain transmission unit in the detection period.

18. A network device, comprising a processor, a memory, and a computer program that is stored in the memory and that can run on the processor, wherein steps of the information transmission method according to claim 14 are performed in the case that the computer program is executed by the processor.

19. The network device according to claim 18, wherein the detection position is located at a specific position in the detection period, or the detection position is located at any position in the detection period.

20. The network device according to claim 18, wherein the downlink transmission identification signal carries: first indication information used for indicating a starting position of channel occupancy time (COT) of a network device, and/or second indication information used for indicating whether there is downlink data in the detection period.

* * * * *